US007660597B2

(12) United States Patent
Fujii

(10) Patent No.: US 7,660,597 B2
(45) Date of Patent: Feb. 9, 2010

(54) INTERNET TELEPHONE SYSTEM, CALL CONNECTION CONTROLLER, TERMINAL ASSOCIATION METHOD USED THEREIN AND ITS PROGRAM

(75) Inventor: Shigeo Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 1055 days.

(21) Appl. No.: 10/760,423

(22) Filed: Jan. 21, 2004

(65) Prior Publication Data

US 2004/0152467 A1 Aug. 5, 2004

(30) Foreign Application Priority Data

Jan. 27, 2003 (JP) .............................. 2003-016888

(51) Int. Cl.
*H04B 7/00* (2006.01)
(52) U.S. Cl. ............. 455/517; 379/211.01; 379/211.02; 379/212.01
(58) Field of Classification Search ................. 455/417, 455/461
See application file for complete search history.

(56) References Cited

U.S. PATENT DOCUMENTS

| 6,970,696 | B1 * | 11/2005 | Fuoss et al. ................. 455/417 |
| 2004/0125937 | A1 * | 7/2004 | Turcan et al. .......... 379/265.02 |
| 2004/0203752 | A1 * | 10/2004 | Wojaczynski et al. .... 455/432.1 |

FOREIGN PATENT DOCUMENTS

| EP | 1179949 | 2/2002 |
| EP | 1246436 | 10/2002 |
| GB | 2 357 659 A | 6/2001 |
| JP | 09-093630 | 4/1997 |
| JP | 11-146091 | 5/1999 |
| JP | 11-284741 | 10/1999 |
| JP | 2000-115354 | 4/2000 |
| JP | 2001-086209 | 3/2001 |
| JP | 2001-186195 | 7/2001 |
| JP | 2001-197205 | 7/2001 |
| JP | 2002-199026 | 7/2002 |
| KR | 1999-0073404 | 10/1999 |
| KR | 2001-0106965 | 12/2001 |
| KR | 2002-0073462 | 9/2002 |
| WO | WO-98/48558 | 10/1998 |
| WO | WO-0059190 | 10/2000 |

OTHER PUBLICATIONS

Korean Office Action dated Mar. 31, 2006 (and English translation of same).
Korean Office Action dated Oct. 27, 2005 (and English translation of relevant portion).

* cited by examiner

*Primary Examiner*—Creighton Smith
(74) *Attorney, Agent, or Firm*—Dickstein Shapiro LLP

(57) ABSTRACT

A PBX, when notified information of an originating manipulation such as dialing of a receiver's number from a keyboard connected with a PC, judges whether an origination request is from the PC or a first terminal. In a case of the request being from the PC, the PBX performs number analysis processing of the PC which is the originator. The PBX judges whether there is information about a terminal associating with the terminal requesting the origination, and when there is information for the terminal, performs to connect with the associating terminal, and processes the origination request to thereby connect with the counterpart terminal. When there is no information about the terminal, the PBX processes the origination request as usual to thereby connect with the counterpart terminal.

75 Claims, 13 Drawing Sheets

| TERMINAL NO | ASSOCIATE PC ADDRESS | ASSOCIATE PC TERMINAL NO |
|---|---|---|
| 3000 | 192. 168. 0. 160 | 3010 |
| 2000 | 192. 168. 20. 50 | 2010 |
| 2500 | 10. 45. 128. 38 | 2510 |
| 4561 | 172. 16. 18. 60 | 4571 |
| 2381 | 10. 48. 55. 64 | 2391 |
| 1546 | 172. 18. 253. 8 | 1556 |

| ASSOCIATE PC ADDRESS | ASSOCIATE PC TERMINAL NO | TERMINAL NO |
|---|---|---|
| 192. 168. 0. 160 | 3010 | 3000 |
| 192. 168. 20. 50 | 2010 | 2000 |
| 10. 45. 128. 38 | 2510 | 2500 |
| 172. 16. 18. 60 | 4571 | 4561 |
| 10. 48. 55. 64 | 2391 | 2381 |
| 172. 18. 253. 8 | 1556 | 1546 |

INTERNET TELEPHONE SYSTEM, CALL CONNECTION CONTROLLER, TERMINAL ASSOCIATION METHOD USED THEREIN AND ITS PROGRAM

BACKGROUND OF THE INVENTION

1. Field of the Invention

The present invention relates to an Internet telephone system, a call connection controller, a terminal association method used therein, and its program. In particular, the present invention relates to a method of associating an existing extension telephone and a personal computer having an Internet telephone function.

2. Related Art

Conventionally, as a method of associating with this type of personal computer (hereinafter referred to as PC), there is one in which a voice input/output port and a MIDI (Musical Instrument Digital Interface) port, of a sound card installed in an extension slot of a PC, are connected with the main body of a handset (see, for example, the Japanese Patent Application Laid-open No. 2000-115354 (pp.4-5, FIG. 1), hereinafter referred to as Patent Document 1).

The main body of the handset is equipped with a speaker and a hook switch and is capable of being connected with a sound card. In a case of the sound card being connected with the main body of the handset, the voice input/output port and the MIDI are connected with the speaker and the handset, and a voice input/output mode, corresponding to on-hook information from the hook switch or signals indicating the on-hook information, is used.

In another association method with a PC, IP (Internet Protocol) telephones as communication terminals and PCs corresponding to the respective IP telephones are interconnected over a LAN (Local Area Network), and with a control by the PC, an IP telephone corresponding to the PC is associated (see, for example, the Japanese Patent Application Laid-open No. 2002-199026 (pp.9-10, FIG. 1), hereinafter referred to as Patent Document 2).

FIG. 1 shows a call operation between terminals through a PBX (Private Branch Exchange) which is a typical call connection controller. In FIG. 1, a call between a first terminal 91 and a second terminal 92, each of which is a radio mobile terminal, is made in such a manner that the terminals are connected with the PBX 6 via radio base stations 81, 82, and a voice path between the two terminals is defined by a connection switch (not shown) in the PBX 6. In a case that the first terminal 91 and the second terminal 92 are fixed-line terminals, the first terminal 91 and the second terminal 92 are interconnected over a line of the PBX 6.

FIG. 2 shows an exemplary structure of a typical Internet telephone system. In FIG. 2, a PC 7 includes, a voice input/output unit 71, a communication interface (I/F) 72 which transmits/receives Internet telephone information over an Internet line 200 such as a LAN, and a control software 73 for transmitting/receiving call control information between the PBX 6.

Conventionally, when making a call using an Internet telephone, dialing the receiver's number from a keyboard 74 connected with the PC 7, or activating an application such as a telephone book so as to perform an originating manipulation.

A call is realized by using a handset 75 connected with the voice input/output unit 71. Voice information is transmitted/received with a use of the Internet line 200 such as a LAN via the handset 75 and the PC 7. In a case that there are terminals accommodated in the PBX 6, for example, the first terminal 91 and the second terminal 92 which may be radio mobile terminals such as PHS (Personal Handy-phone System) or fixed-line terminals, a user holds two devices, that is, the handset 75 and the terminal 91. Further, extension numbers managed by the PBX 6 are assigned to the two devices, that is, the handset 75 and the terminal 91, respectively, so that it may be troublesome for the user to manage terminal devices and telephone numbers.

Further, in the aforementioned Internet telephone system, voice information is to be transmitted/received over the Internet line 200 such as a LAN. Therefore, in addition to line equipment for the PBX constructed for one user, it is required to secure the Internet line 200 such as a LAN taking into account the transmission/reception of the voice information for the-handset.

Further, in the aforementioned Internet telephone system, when a voice connection is made between the PC 7 and the second terminal 92, digital voice information from the PC 7 is converted into an IP packet at an IP converter 61 in the PBX 6, and this packet data is transmitted to the second terminal 92 over the Internet line 200.

In the conventional Internet telephone system described above, if the Internet telephone is one using a PC, there is a problem of lacking in secrecy since speaking contents are output from the speaker of the PC. In order to solve this problem, the technique described in the aforementioned Patent Document 1 improves the secrecy by connecting a handset with a hook switch. However, with the technique of Patent Document 1, the handset is connected with the PC by a wire, so that there is a problem that the movable range of the user using the handset is limited to the length of the cable connecting the handset with the PC.

Even in a case the handset is replaced with the one of a codeless type in order to improve the freedom of the movable range of the user, voice information is transmitted over the Internet line. Therefore, as the number of used IP telephones increases, it is necessary to secure enough bands in the Internet line 200 for coping with the increased number.

Further, in the conventional Internet telephone system, there is a problem that an Internet telephone using the PC cannot be used as a telephone when the power source of the PC is off.

In the technique described in the aforementioned Patent Document 2, although an association between the PC and the terminal is shown, it is so structured that call connection information from the call connection controller is received for a while at an application on the PC, and via a LAN with which the PC is connected, the PC and the existing terminal are associated. Therefore, when a call arrives, the PC and the terminal can be associated. However, if a call is originated from the terminal, origination information is not output from the terminal to the PC. Consequently, the PC and the terminal cannot be associated at the time of origination. This means that in a case of originating from the terminal, the terminal cannot be used as a handset of the PC.

In this case, since the voice information is transmitted/received via the PC and the LAN, if the number of PCs having the Internet telephone function increases, it is necessary to secure the enough bands of the LAN corresponding to the increase. Again, there is a problem that the terminal association at the time of origination cannot be realized if the power source of the PC is off.

SUMMARY OF THE INVENTION

It is therefore an object of the present invention to provide an Internet telephone system, a call connection controller, a terminal association method used therein and its program, which are capable of solving the aforementioned problems, establishing associations between Internet telephones and existing extension terminals, and increasing a freedom of a place where a user can stay.

In order to achieve the object, an Internet telephone system according to the present invention comprises: an information processor having an Internet telephone function enabling to make a call to a counterpart terminal; and a call connection controller which connects with the information processor over an Internet line and accommodates a telephone terminal. The telephone terminal is used as an Internet handset. As a transmission path for voice data transmitted or received by the Internet handset, a line held by the call connection controller is used.

In the present invention, a telephone terminal is used as an Internet handset so that a call is made through an Internet telephone. As a transmission path of voice data transmitted or received by the Internet handset (telephone terminal), a line held by the call connection controller is used.

According to the present invention, a line of the call connection controller secured for the telephone terminal is used. Therefore, even when the number of information processors having the Internet telephone function (for example, PCs) increases, it is not required to increase the capacity of the Internet line and is able to suppress the running cost to a low level.

In a case that the Internet handset is a radio mobile terminal, an area where a user can move with the terminal is enlarged. Further, even in a case that the power source of the PC is off, information can be immediately exchanged since a call is made using the line held by the call connection controller.

In the present invention, the call connection controller is provided with a means for causing the information processor and the telephone terminal corresponding to each other to share call control information at the time of making a call to the counterpart terminal, to thereby realize an association between the information processor and the telephone terminal.

The information processor and the telephone terminal can share call control information at the time of making a call to the counterpart terminal. Thereby, the same information can be shared by the telephone terminal to which a call is made and the information processor.

In this case, the call connection controller may be provided with a means for transferring a call reception request from the counterpart terminal, to each of the information processor and the telephone terminal corresponding to each other, instead of the aforementioned structure.

Further, the call connection controller may be provided with a means for causing the information processor and the telephone terminal corresponding to each other to share call control information at the time of making a call to the counterpart terminal, and a means for transferring a call reception request from the counterpart terminal, to each of the information processor and the telephone terminal corresponding to each other.

It is preferable that the call connection controller according to the present invention connect with an information processor having an Internet telephone function enabling to make a call to the counterpart terminal, accommodate a telephone terminal, and include means for causing the information processor and the telephone terminal corresponding to each other to share call control information at the time of making a call to the counterpart terminal.

The call connection controller of the present invention may connect with an information processor having an Internet telephone function enabling to make a call to a counterpart terminal, accommodate a telephone terminal, and include a means for transferring a call reception request from the counterpart terminal to each of the information processor and the telephone terminal corresponding to each other.

Further, the call connection controller of the present invention may connect with an information processor having an Internet telephone function enabling to make a call to a counterpart terminal, accommodate a telephone terminal, and comprise: a means for causing the information processor and the telephone terminal corresponding to each other to share call control information at a time of making a call to the counterpart terminal, and a means for transferring a call reception request from the counterpart terminal to each of the information processor and the telephone terminal corresponding to each other.

A terminal association method according to the present invention comprises the steps of: accessing from an information processor having an Internet telephone function to a call connection controller so as to define a call path using an Internet line between a counterpart terminal; and causing the telephone terminal accommodated in the call connection controller and corresponding to the information processor, and the information processor, to share call control information at a time of making a call from the call connection controller to the counterpart terminal.

The terminal association method of the present invention may comprise the steps of: accessing from an information processor having an Internet telephone function to a call connection controller so as to define a call path using an Internet line between an counterpart terminal; and transferring a call reception request from the counterpart terminal, to the information processor and the telephone terminal accommodated in the call connection controller and corresponding to the information processor.

Further, the terminal association method of the present invention may comprise the steps of: accessing from an information processor having an Internet telephone function to a call connection controller so as to define a call path using an Internet line between an counterpart terminal; causing a telephone terminal accommodated in the call connection controller and corresponding to the information processor, and the information processor, to share call control information at a time of making a call from the call connection controller to the counterpart terminal, and transferring a call reception request from the counterpart terminal to the information processor and the telephone terminal corresponding to each other.

A program for executing the terminal association method according to the present invention is constructed as an electric signal for causing a computer of the call connection controller to execute the steps of: accessing from an information processor having an Internet telephone function to a call connection controller so as to define a call path using an Internet line between an counterpart terminal; and causing a telephone terminal accommodated in the call connection controller and corresponding to the information processor, and the information processor, to share call control information at a time of making a call from the call connection controller to the counterpart terminal.

The program for executing the terminal association method of the present invention may be constructed as an electric signal for causing a computer of the call connection controller to execute the steps of: accessing from an information processor having an Internet telephone function to a call connection controller so as to define a call path using an Internet line between an counterpart terminal; and transferring a call reception request from the counterpart terminal to the information processor and to a telephone terminal accommodated in the call connection controller and corresponding to the information processor.

Further, the program for executing the terminal association method of the present invention may be constructed as an electric signal for causing a computer of the call connection controller to execute the steps of: accessing from an information processor having an Internet telephone function to a call connection controller so as to define a call path using an Internet line between an counterpart terminal; causing a telephone terminal accommodated in the call connection controller and corresponding to the information processor, and the information processor, to share call control information at a time of making a call from the call connection controller to the counterpart terminal, and transferring a call reception request from the counterpart terminal to the information processor and the telephone terminal corresponding to each other.

That is to say, the Internet telephone system of the present invention uses a terminal accommodated in a PBX (call connection controller), for example, a radio mobile terminal such as a local PHS (Personal Handy-phone System) or a fixed-line terminal, as a handset for the Internet telephone so as to utilize existing telephone equipment, succeed conventional call operation, and transmit/receive voice data using a line of the existing PBX, which makes it possible to construct an Internet telephone system which is not required to additionally secure a band for a voice in the Internet line.

An advantage of an Internet telephone of a personal Computer (PC) type lies in that an Internet telephone may be easily realized by adding a control software in the PC, for controlling communications. Further, by adding an application in the PC, it is possible to provide functions which are not provided in conventional extension terminals, for example, a function of specifying an originating user based on number information, a function of sharing a file in the PC, or the like.

The Internet telephone system of the present invention uses a radio mobile terminal or a fixed-line terminal accommodated in the conventional PBX, and informs the PC of call control information at the time of origination or reception. Thereby, applications of the Internet telephone constructed by the PC, for example, a function of specifying an originating user based on number information, a function of sharing a file in the PC, or the like, may be used, while keeping compatibility of the conventional call operation.

Further, in the Internet telephone system of the present invention, voice information is transmitted/received using line equipment for the PBX which has been already constructed by the user. Therefore, it is not required to secure a band necessary for transmitting/receiving voice information to the Internet line such as a LAN (Local Area Network).

That is to say, in the Internet telephone system of the present invention, a call reception request which arises at the time of arriving at the counterpart terminal is transferred to a PC and to a radio mobile terminal or a fixed-line terminal corresponding to each other, respectively, and a call reception request which arises at the time of making a call to the counterpart terminal is transferred to a PC and to a radio mobile terminal or a fixed-line terminal corresponding to each other, respectively, and informing the PC of call control information which arises at the time of making a call from a radio mobile terminal or a fixed-line terminal to the counterpart terminal. Thereby, applications of the Internet telephone constructed by the PC, for example, a function of specifying an originating user based on number information, a function of sharing a file in the PC, or the like, may be used, while keeping compatibility of the conventional call operation.

BRIEF DESCRIPTION OF THE DRAWINGS

FIG. 4 is a table showing an exemplary table structure in a database of FIG. 3;

FIG. 5 is a table showing an exemplary table structure in a database in FIG. 3;

PREFERRED EMBODIMENT OF THE PRESENT INVENTION

Next, embodiments of the present invention will be described with reference to the drawings.

Figure 1:
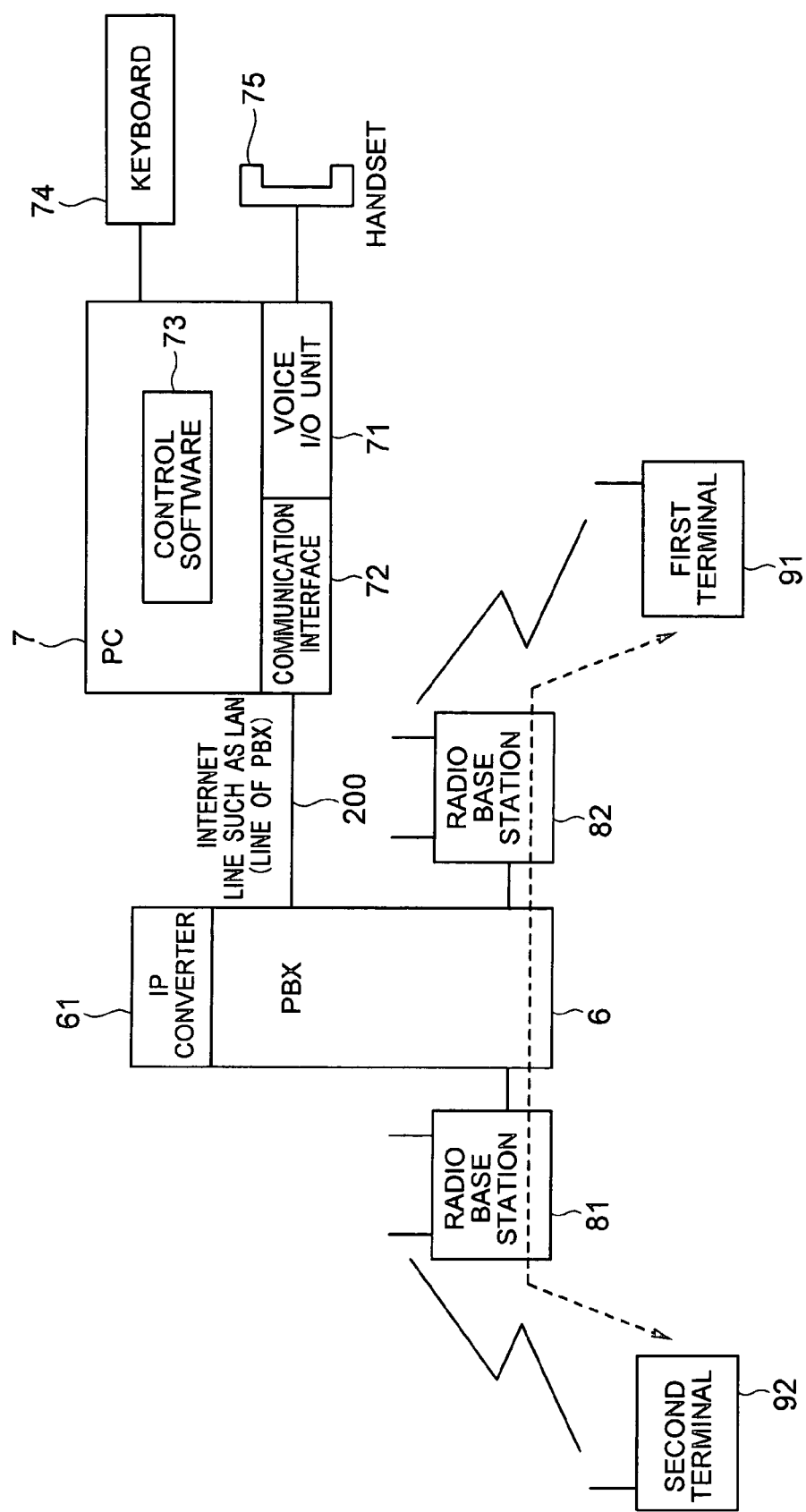
FIG. 1 is a block diagram showing an exemplary structure of making a call between terminals using a conventional PBX.
Figure 2:
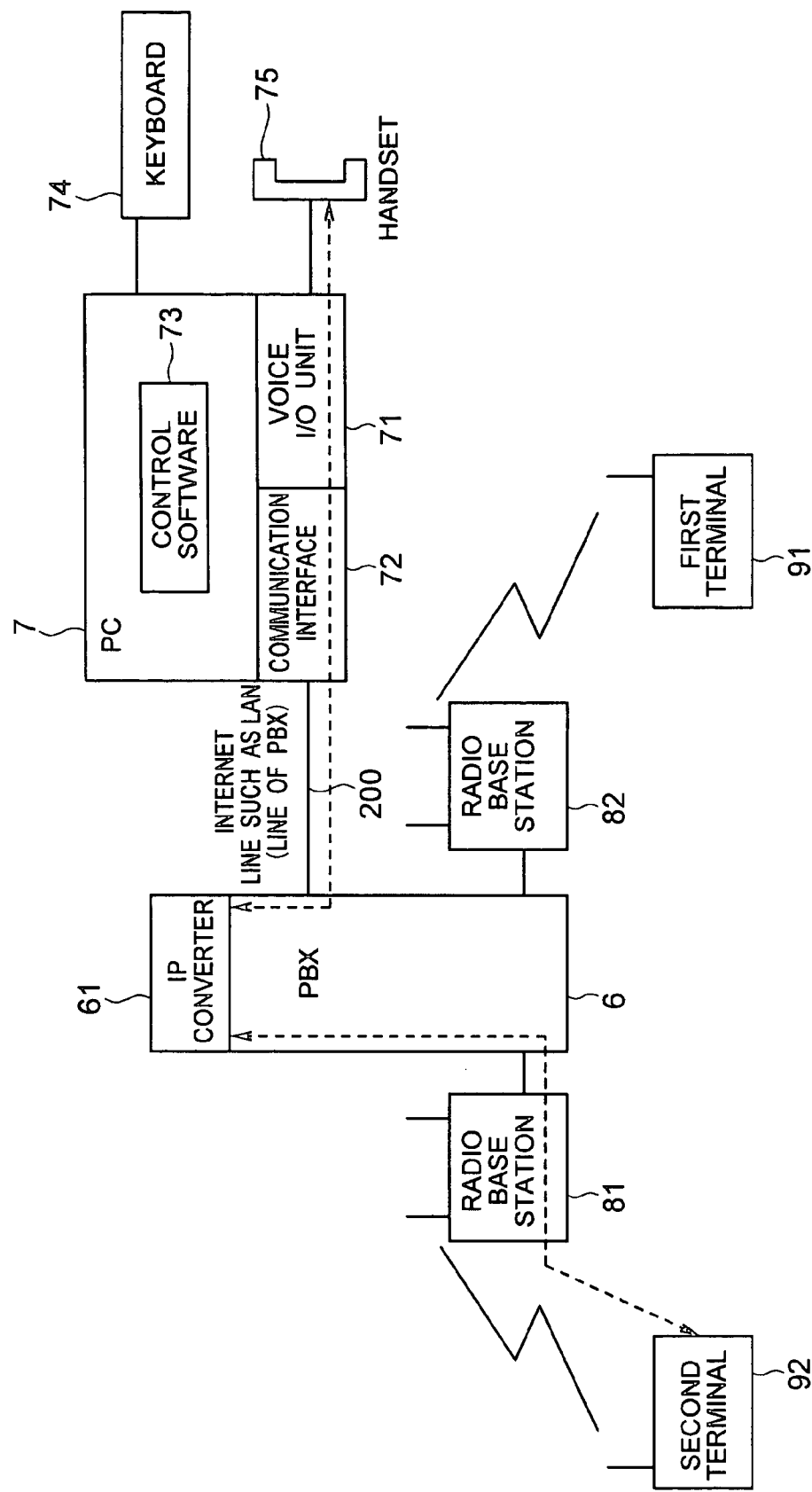
FIG. 2 is a block diagram showing an exemplary structure of making a call between terminals using a conventional Internet telephone system.
Figure 3:
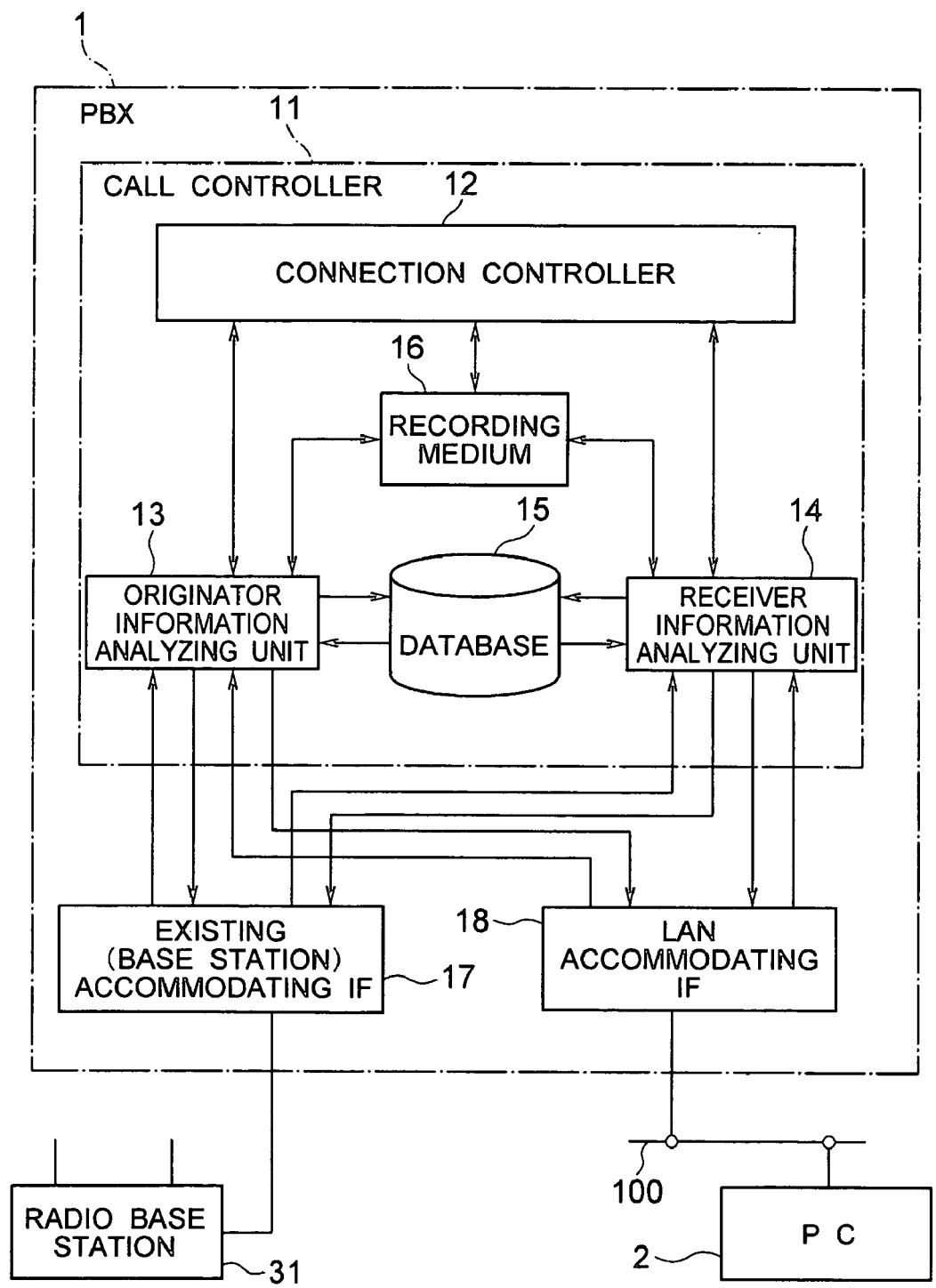
FIG. 3 is a block diagram showing an exemplary structure of a call connection controller according to a first embodiment of the present invention.
Figure 9:
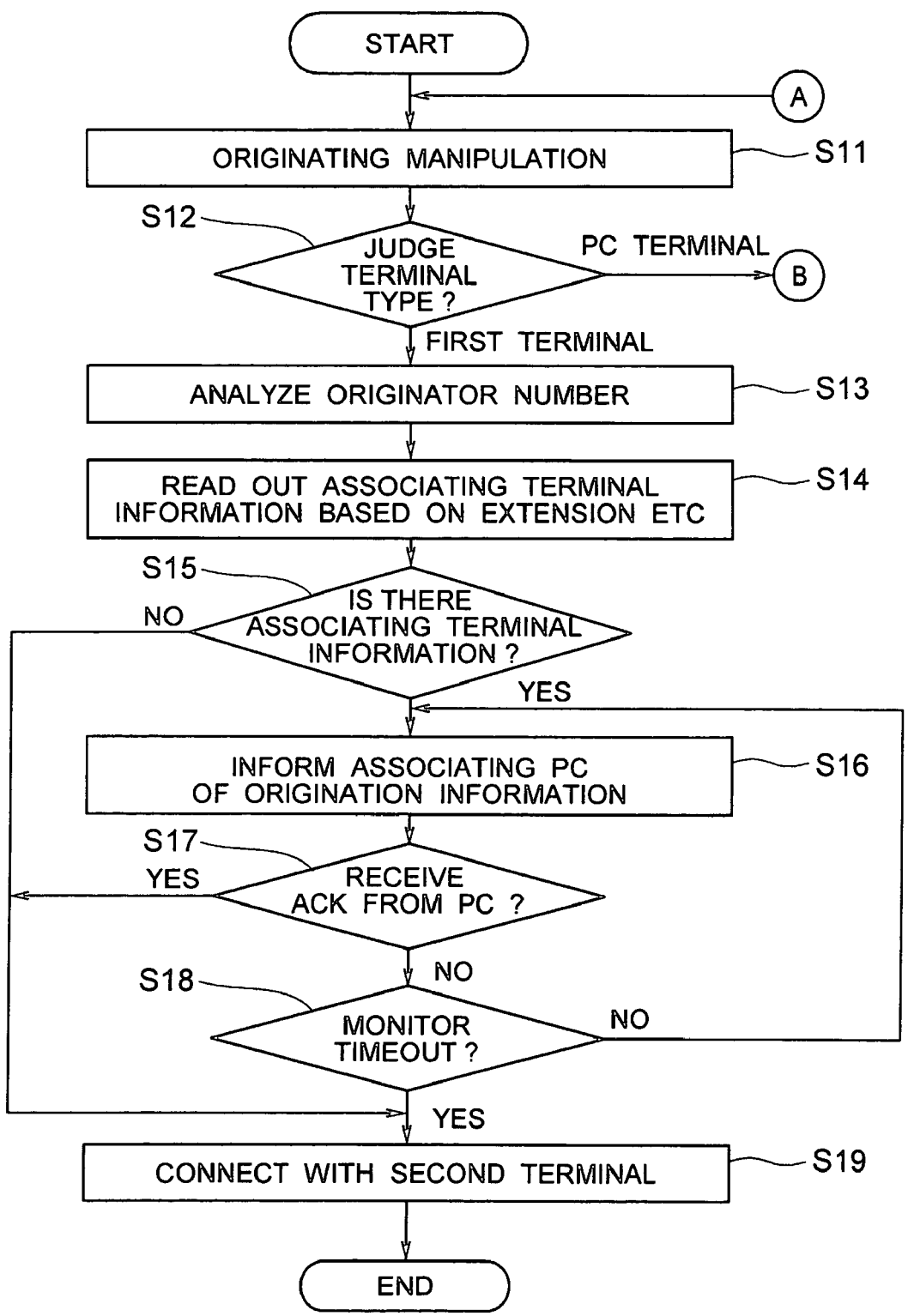
FIG. 9 is a flowchart showing an operation of making a call using a first terminal in FIG. 8.

As shown in FIGS. 3 and 9, an Internet telephone system according to the present invention includes, as the basic structure, information processors 2, 5 each having an Internet telephone function enabling to make a call to a counterpart terminal 41 or 42, and a call connection controller 1 which is connected with the information processors 2, 5 over Internet lines 100a, 101a and accommodates a telephone terminal 41 or 42. The Internet telephone system uses the telephone terminals as handsets (see FIG. 1, reference numeral 75), and uses lines 100b, 101b held by the call connection controller 1 as transmission paths of voice data transmitted/received by the handsets.

Further, the call connection controller 1 includes, a means for causing the information processor and the telephone terminal corresponding to each other to share call control information at the time of making a call to the counterpart terminal, or a means for transferring, to each of the information processor and the telephone terminal corresponding to each other, a call reception request from the counterpart terminal. The call connection controller 1 may include both the means for causing the information processor and the telephone terminal corresponding to each other to share call control information at the time of making a call to the counterpart terminal, and the means for transferring to each of the information processor and the telephone terminal corresponding each other, a call reception request from the counterpart terminal.

Figure 8:
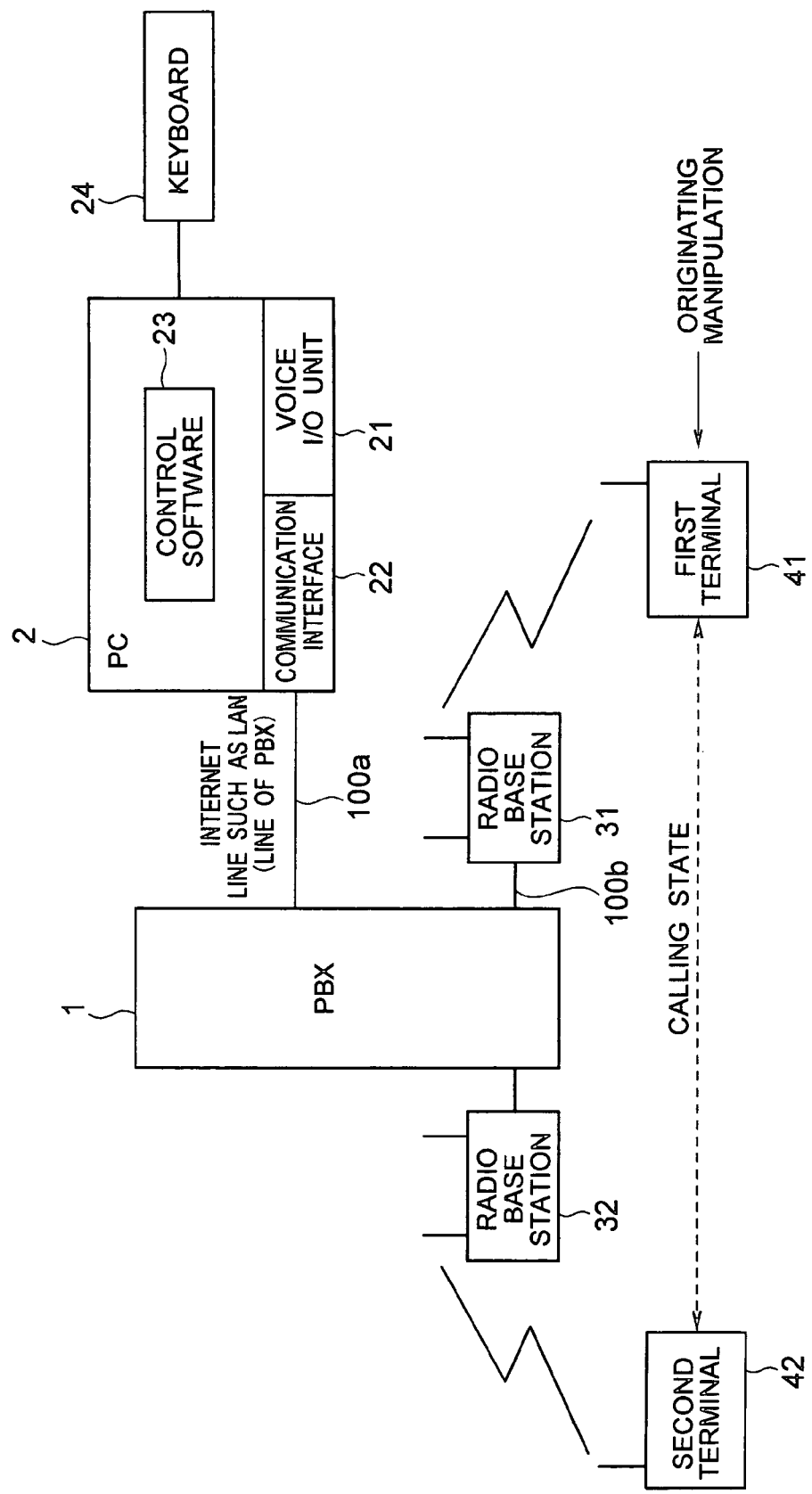
FIG. 8 is a diagram showing an operation of making a call using a first terminal in FIG. 6.
Figure 11:
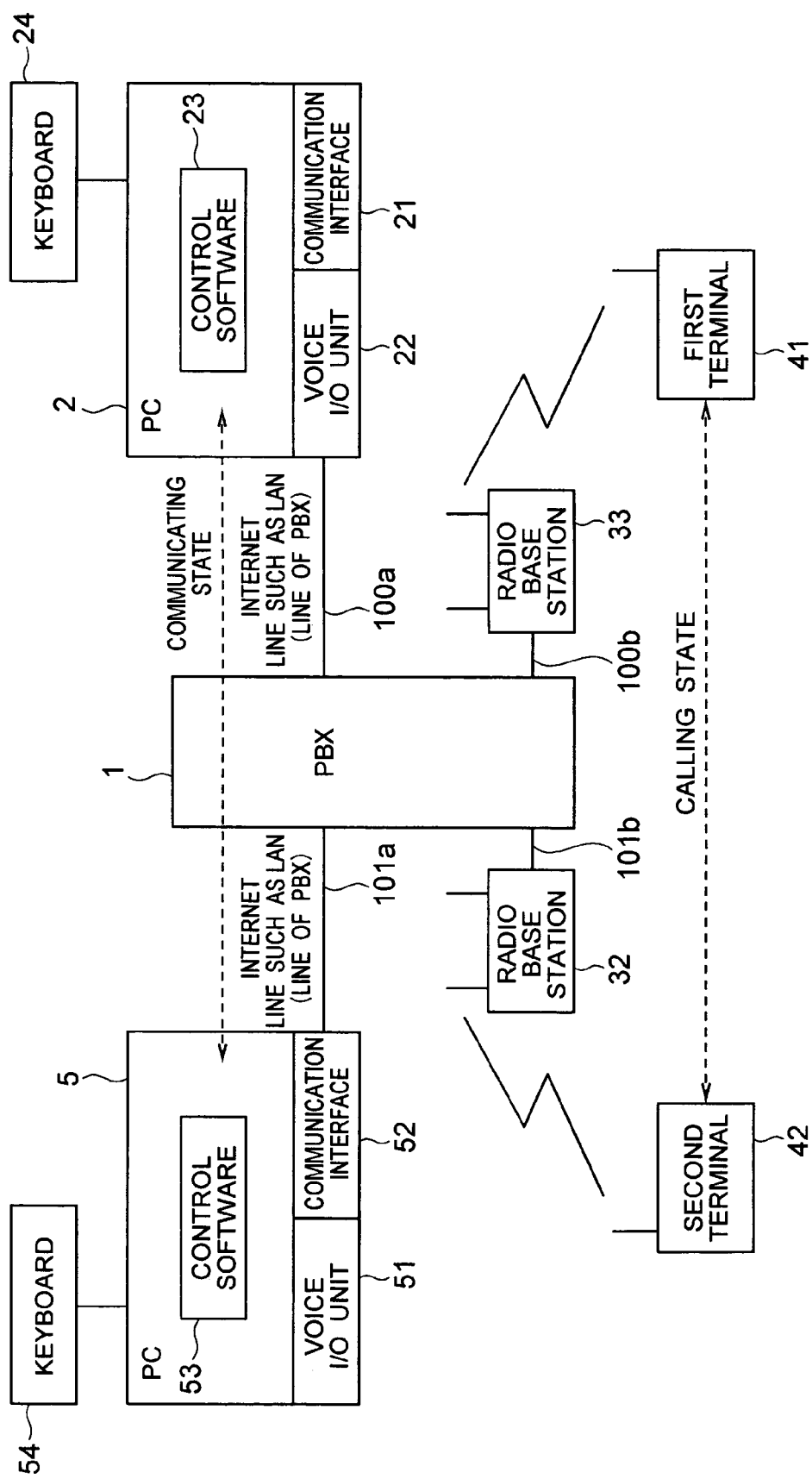
FIG. 11 is a block diagram showing the structure of an Internet telephone system according to another embodiment of the present invention.

In FIGS. 8 and 11, an operational state, in which a call is made in the Internet telephone system of the present invention, is shown.

FIG. 3 is a block diagram showing an exemplary structure of a call connection controller according to a first embodiment of the present invention. FIG. 3 shows the structure of a case that a PBX (Private Branch Exchange) 1 is used as a call connection controller in the first embodiment of the present invention.

The PBX 1 includes, a call controller 11, an existing (base station) accommodating I/F (interface) 17 for connecting a radio base station 31 or the like, and a LAN (Local Area Network) accommodating IF 18 for connecting a personal computer (PC) over an Internet line 100 such as a LAN.

The call controller 11 includes, a connection controller 12, an originator information analyzing unit 13, a receiver information analyzing unit 14, a database 15, and a recording medium 16. The connection controller 12 performs a call connection based on connection information notified from the originator information analyzing unit 13 and the receiver information analyzing unit 14.

The originator information analyzing unit 13 performs processing to obtain, from the database 15, number information notified from the originating terminal. The receiver information analyzing unit 14 performs processing to obtain, from the database 15, receiver information. The database 15 stores terminal association information described later. The recording medium 16 is a medium such as a memory for storing a program (a program executable on a computer) for controlling the PBX 1.

The existing (base station) accommodating IF 17 is an interface accommodating radio mobile terminals as well as existing fixed-line terminals through a radio base station 31. The LAN accommodating IF 18 is an interface for transmitting/receiving information to/from an Internet telephone function of a PC 2 connected with the Internet line 100a such as a LAN. Here, radio mobile terminal (terminals 41, 42 shown in FIGS. 8 and 9) and fixed-line terminals and the like serve as telephone terminals corresponding to the PCs 2 as information processors. These are terminals which have already been established and accommodated in the PBX 1.

As shown in FIG. 4, the database 15, according to the first embodiment of the present invention, has a table 15a for searching for associate PCs 2 based on terminal numbers assigned to the terminals (including fixed-line terminals) 41, 42. Further, the database 15 according to the first embodiment of the present invention has, in addition to the table 15a shown in FIG. 4, a table 15b for searching for the terminal numbers of the terminals (including fixed-line terminals) 41, 42 based on the PCs 2.

In FIG. 4, the table 15a stores, a "terminal number" ("3000", "2000", "2500", "4561", "2381", "1546"), an "associate PC address" ("192.168.0.160", "192.168.20.50", "10.45.128.38", "172.16.18.60", "10.48.55.64", "172.18.253.8"), and an "associate PC terminal number" ("3010", "2010", "2510", "4571", "2391", "1556"), respectively, in this order.

In FIG. 5, the table 15b stores, an "associate PC address" ("192.168.0.160", "192.168.20.50", "10.45.128.38", "172.16.18.60", "10.48.55.64", "172.18.253.8"), "associate PC terminal number" ("3010", "2010", "2510", "4571", "2391", "1556"), and a "terminal number" ("3000", "2000", "2500", "4561", "2381", "1546"), respectively, in this order.

Figure 6:
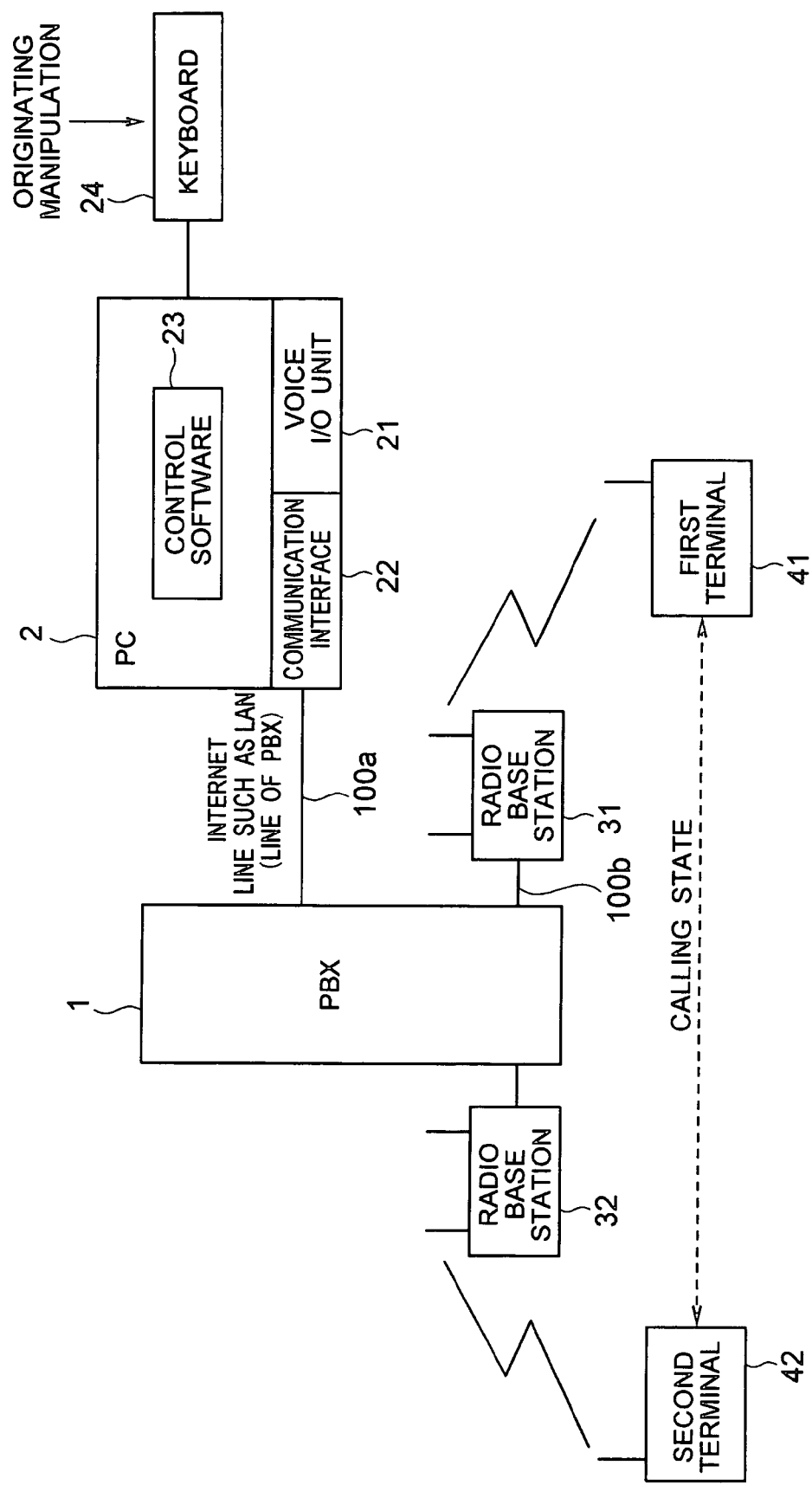
FIG. 6 is a block diagram showing the structure of an Internet telephone system according to the first embodiment of the present invention.

In FIG. 6, the Internet telephone system according to the first embodiment of the present invention includes, the PBX 1, the PC 2, radio base stations 31, 32 connected with the PBX 1, and a first terminal 41 and a second terminal 42 which are radio mobile terminals or fixed-line terminals, accommodated in the PBX 1. The PBX 1 is formed of a computer, and with the computer executing a program in the recording medium 16, various controls of the PBX 1 are realized.

The PC 2 has a voice input/output unit 21, a communication interface (I/F) 22 for transmitting/receiving internet telephone information over an Internet line 100 such as a LAN, and a control software 23 for controlling communications necessary for transmitting/receiving control information between the PBX (call connection controller) 1. The PC 2 has an Internet telephone function which enables to make a call to a counterpart terminal over the Internet line 100a such as a LAN. Although the Internet telephone function provided to the PC is a general purpose one which is currently provided, it is not limited to one currently provided, since the Internet telephone function provided is not to be altered.

When making a call using the PC 2, an originating manipulation is made by dialing the receiver's number using a keyboard 24 connected with the PC 2, or by activating an application such as a telephone book. In the PBX 1, information about the PC 2 and information about the first terminal 41 associating with the PC 2 have been registered beforehand in the database 15 so as to be corresponded one to one. When the PBX 1 receives an origination request from the PC 2, the PBX 1 performs a call connection request to the second terminal 42, and at the same time, establishes a call path between the first terminal 41 and the second terminal 42 by using a line held by the PBX 1.

Figure 7:
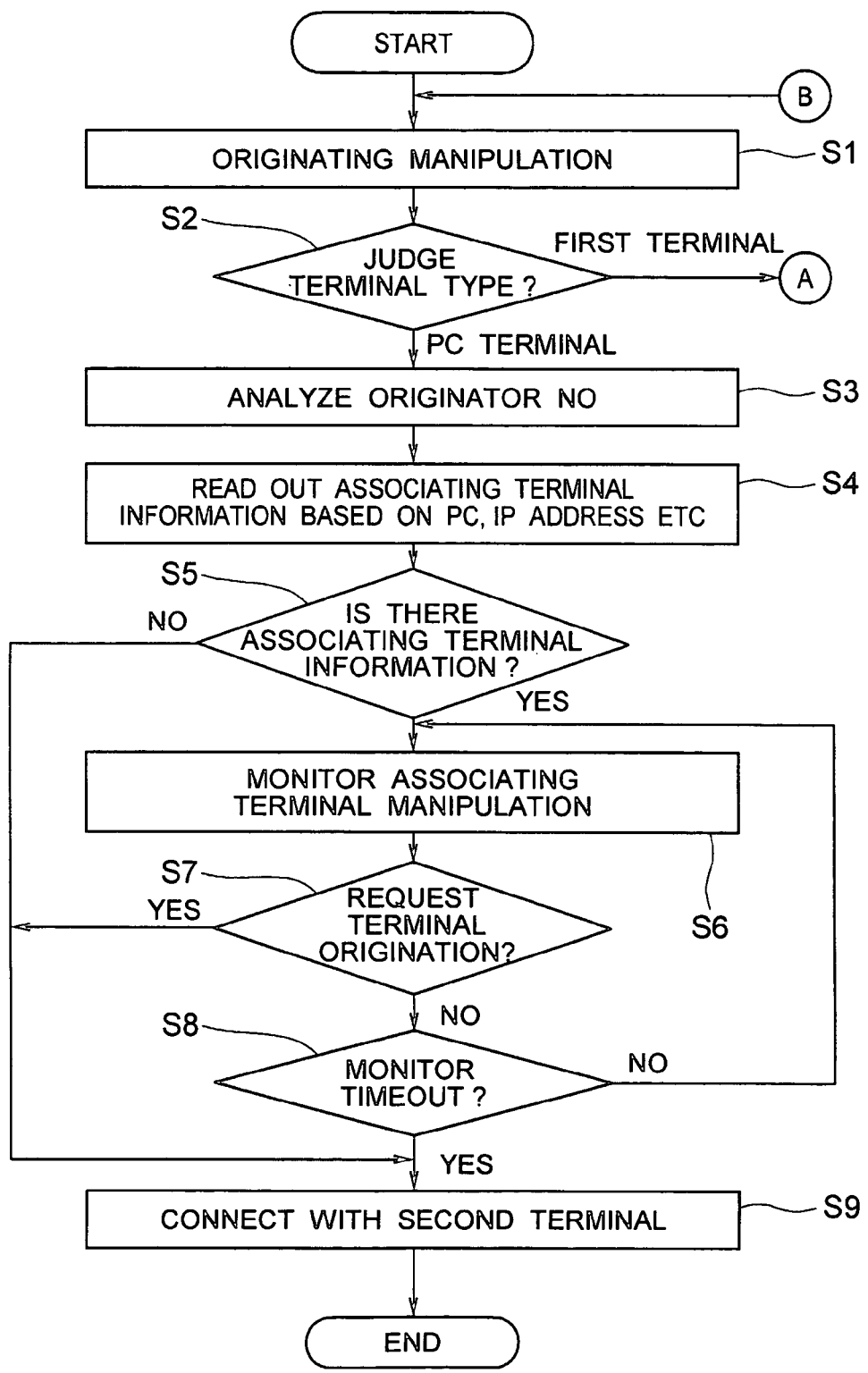
FIG. 7 is a flowchart showing an operation of making a call using a PC in FIG. 6.

FIG. 7 is a flowchart showing an operation of making a call using the PC 2 in FIG. 6. Referring to FIGS. 3 to 7, the operation of the Internet telephone system according to the first embodiment of the present invention will be described. It should be noted that processing shown in FIG. 7 is realized by a computer of the PBX 1 executing a program in the recording medium 16. The program in the recording medium 16 is one in which the processing order in FIG. 7 is written in the programming language. The computer reads out the program and outputs it as an electric signal, based on which the function of the PBX1 is realized.

When making a call with a use of the PC 2, information is output to the PBX 1 by dialing the receiver's number using a keyboard 24 connected with the PC 2, or by performing originating manipulation by activating an application such as a telephone book on the PC 2. Upon receipt of the information from the PC 2, the PBX 1 starts processing by activating the originating manipulation (step S1 in FIG. 7).

The PBX 1 judges the origination request. The judgment of the origination request is performed to judge whether the origination request is from the PC 2 or from the first terminal 41 which is in the corresponding relationship with the PC 2 (step S2 in FIG. 7). If the result of the judgment shows that the request is from the PC 2, the PBX 1 performs number analysis processing of the PC 2, which is the originator (step S3 in FIG. 7). The number analysis processing is performed using a number which can specify the PC 2, identification information such as one used for transmitting/receiving control information between the PBX 1, or data of IP (Internet Protocol) address. As for the case that the origination request is from the first terminal 41, processing described later is executed.

The PBX 1, when performed the number analysis processing of the PC 2, searches for information about associating first terminal 41, for example, the unique extension (terminal number) of the terminal, among pieces of information which have been registered beforehand in the database 15 of the PBX 1, based on the number from which the PC 2 can be specified (in the present embodiment, IP address) (step S4 in FIG. 7).

Based on the search result, the PBX 1 judges whether there is information about a terminal associating with the PC 2 (step S5 in FIG. 7). If there is no information about the associating terminal, that is, information corresponding to the first terminal 41 associating with the PC 2, the PBX 1 continues processing for connecting with the counterpart terminal (the second terminal 42) using the Internet line 100*a*. Since there is no terminal equivalent to the first terminal 41 in the PC 2, the user starts speaking, when the receiver replies, to the second terminal 42, which is the counterpart terminal, over the Internet line 100*a* by using a handset of the PC 2 (step S9 in FIG. 7). This handset corresponds to the general purpose handset 75 shown in FIG. 1, and is connected with the voice input/output unit 21 of the PC 2.

If there is information about an associating terminal, the PBX 1 starts monitoring the state of the first terminal 41 corresponding to the extension searched (step S6 in FIG. 7). The PBX 1, when detects the originating manipulation by the first terminal 41 (step S7 in FIG. 7), continues processing for connecting with the receiver's number input from the keyboard 24 of the PC 2 by using a line held by the PBX 1. When the receiver replies, the user starts speaking, using the first terminal 41, to the second terminal 42, which is the counterpart terminal, over a line held by the PBX 1 (step S9 in FIG. 7).

When the originating manipulation from the first terminal 41 is not detected (step S7 in FIG. 7) and a monitoring timeout is detected (step S8 in FIG. 7), the PBX 1 determines the first terminal 41 is not in the state of being able to originate. Then, the PBX 1 continues processing for connecting with the receiver's number input from the keyboard 24 of the PC 2 by using the Internet line 100*a*. When the receiver replies, the user starts speaking, using a handset connected with the voice input/output unit 21 of the PC 2, over the Internet line 100*a* (step S9 in FIG. 7).

FIG. 8 is a diagram showing an operation of making a call using the first terminal 41 in FIG. 6. Referring to FIGS. 6 and 8, an operation of making a call using the first terminal 41 will be explained.

Processing shown in FIG. 8 is realized by a computer of the PBX 1 executing a program in the recording medium 16.

A connection to the second terminal 42 is performed by manipulating a dial board (not shown) of the first terminal 41 and inputting the terminal number given to the second terminal 42 which is the receiving terminal, or activating the initializing application installed in the first terminal 41. In this case, in the conventional connection mode, if an origination manipulation is performed from the first terminal 41, the PBX 1 performs processing for connecting the first terminal 41 and the second terminal 42 which is the requested connecting counterpart, by using the line 100*b* in itself (PBX 1). However, the conventional PBX, when detecting an origination from the first terminal 41, does not perform processing for connecting the PC 2 and the second terminal 42 using the Internet line 100*a*. In other words, the conventional PBX 1 does not perform processing using the first terminal 41 as a substitute for the handset of the PC 2.

In contrast, the present invention causes the PBX 1 to perform processing using the first terminal 41 as a substitute for the handset of the PC 2. In other words, the PBX 1 has information about the first terminal 41 and the corresponding (associating) PC 2 beforehand by registering one to one (see FIGS. 4 and 5). The call controller 11 of the PBX 1, upon receipt of an origination request from the first terminal 41, requests a call connection to the second terminal 42 using the line 100*b* held by the PBX 1, to thereby establish a call path between the first terminal 41 and the second terminal 42 using the line 100*b* of the PBX 1, and at the same time, to establish a connection between the second terminal 42 and the PC 2 over the Internet line 100*a*. Thereby, the first terminal 41 is used as a substitute for the handset of the PC 2. Therefore, voice data from the user is transmitted to the second terminal 42 from the first terminal 41 which is the substitute for the hand set over the line of the PBX 1. On the other hand, voice data from the counterpart user is transmitted to the first terminal 41 which is the substitute for the handset over the line 100*b* of the PBX 1.

Here, the lines of the PBX 1 include the Internet line 100*a*, in addition to the line 100*b* for connecting terminals as radio mobile bodies and fixed-line terminals.

FIG. 9 is a flowchart showing an operation of making a call using the first terminal 41 in FIG. 8 as a handset. Referring to FIGS. 3 to 5, 8 and 9, an operation of making a call using the first terminal 41 will be explained. It should be noted that the processing operation shown in FIG. 9 is realized by a computer of the PBX 1 executing a program in the recording medium 16.

When making a call using the first terminal 41 as a handset, manipulating a dial board of the first terminal 41 so as to input the terminal number of the second terminal 42, or activating an origination application installed in the terminal 41, to thereby perform a connecting manipulation to the second terminal 42. The PBX 1, upon receipt of the information from the first terminal 41, activates the originating manipulation to start processing (step S11 in FIG. 9).

The PBX 1 judges whether the origination request is from the first terminal 41 or the PC 2 (step S12 in FIG. 9). If it is from the first terminal 41, the PBX 1 performs number analysis processing of the first terminal 41 (step S13 in FIG. 9). It should be noted that if the origination request is from the PC 2, the processing in FIG. 7 described above is performed.

The PBX 1, after performing the number analysis processing of the first terminal 41, searches for information about an associating PC 2 among pieces of information registered in the PBX 1 beforehand such as identification information for use in transmitting/receiving control information between the PBX 1, or an IP address (in the present embodiment, IP address), based on a number, with which the first terminal 41 can be specified, such as identification information for use in transmitting/receiving control information between the PBX 1 (in the present embodiment, an extension (terminal number)) (step S14 in FIG. 9).

The PBX 1 judges from the search result whether there is information about the associating PC (step S15 in FIG. 9). If there is no information about the associating PC, the PBX 1 continues processing for connecting with the second terminal 42 via the line 100*b* of the PBX 1. When the counterpart replies, the user starts speaking with a use of the first terminal 41 over the line 100*b* of the PBX 1 (step S19 in FIG. 9).

If there is information about the associating PC, the PBX 1 informs the PC 2 of origination information indicating that the first terminal 41 is in the state of being able to originate and is performing an origination to the second terminal 42 and the like, based on information about the PC 2 obtained from the aforementioned search, for example, identification information for use in transmitting/receiving the control information between the PBX 1 (in this embodiment, IP address) (step S16 in FIG. 9).

The PBX 1, when an ACK (acknowledgement) to the origination information is replied from the PC 2 (step S17 in FIG.

9), determines that the PC 2 acknowledges a state change in the first terminal 41. This state of the first terminal 41 means that the first terminal 41 is used as a substitute for the handset of the PC 2. Further, the PBX 1 when receives the ACK signal from the PC 2, establishes a connection between the PC 2 and the second terminal 42 using the Internet line 100a. When the counterpart replies, the user uses the first terminal 41 and starts speaking using the line of the PBX 1 (step S19 in FIG. 9).

The PBX 1, when an ACK to the origination information is not replied (step S17 in FIG. 9) and a monitoring timeout is detected (step S18 in FIG. 9), determines that the PC 2 does not acknowledge a state change in the first terminal 41 by a reason of the power being off, or the like. Then, the PBX 1 continues processing for connecting the first terminal 41 and the second terminal 42 using the line 100b of the PBX 1. When the counterpart replies, the user uses the first terminal 41 so as to start speaking over the line 100b of the PBX 1 (step S19 in FIG. 9).

Figure 10:
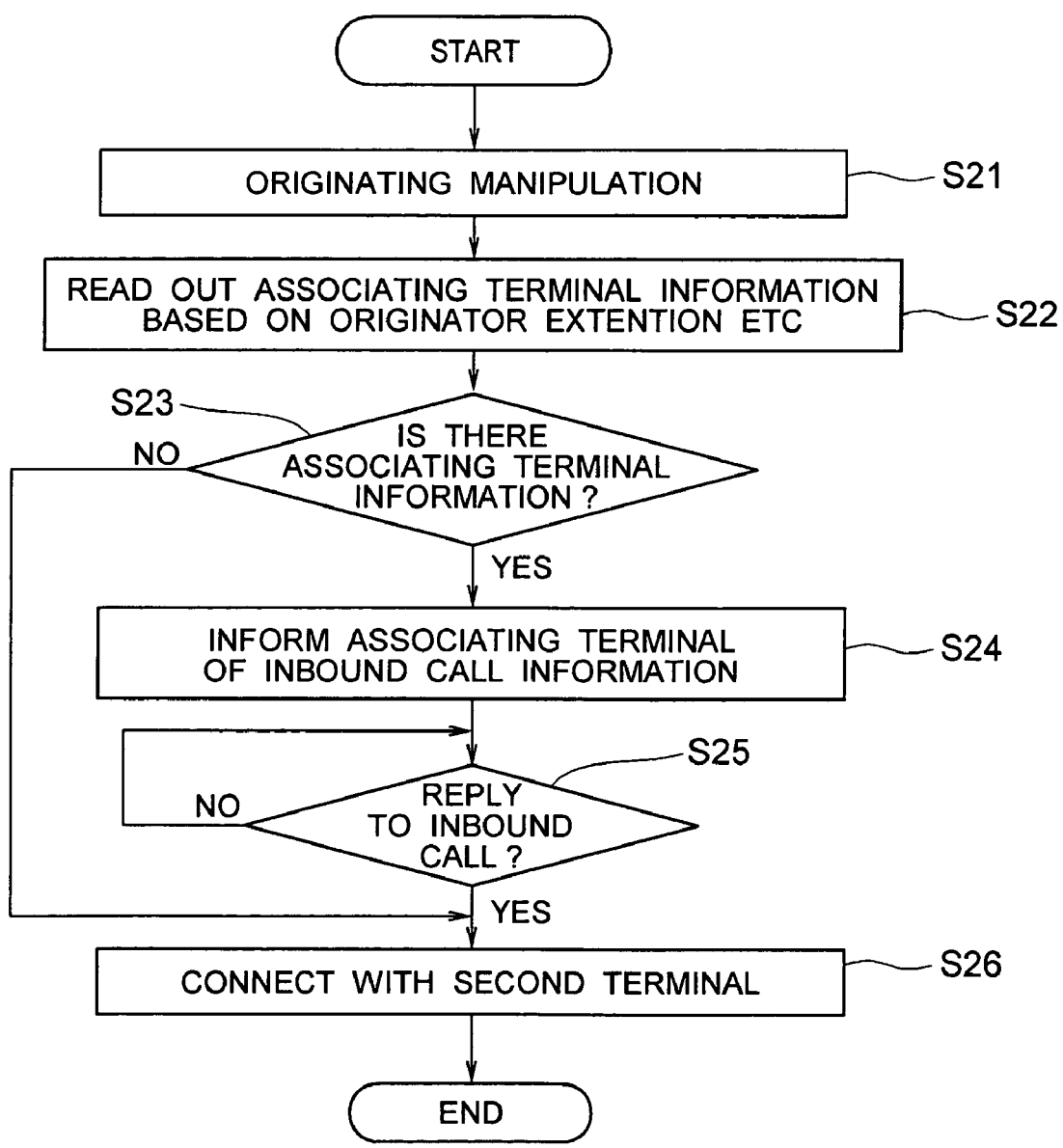
FIG. 10 is a flowchart showing an operation when a call to a user having the PC and the first terminal in FIG. 6 arrives.

FIG. 10 is a flowchart showing an operation when a call to a user having the PC 2 and the first terminal 41 in FIG. 6 arrives. Referring to FIGS. 3 to 6 and 10, an operation, when a call to the user having the PC 2 and the first terminal 41 arrive, will be explained. This processing is realized by a computer of the PBX 1 executing a program in the recording medium 16.

The PBX 1, following an originating manipulation from the user having the second terminal 42 (originating manipulation same as shown in FIG. 5), establishes a call path and starts arrival manipulation at the time of arrival at the user having the PC 2 and the first terminal 41 (step S21 in FIG. 10).

Following the arrival manipulation, the PBX 1, based on the number that the second terminal 42 dials, reads out, from the database 15, registration information indicating whether the terminal with the number associates with the PC 2 (associating terminal information) (step S22 in FIG. 10).

The PBX 1 judges from the search result whether there is information about the associating PC 2 (step S23 in FIG. 10). If there is no information about the associating PC 2, the PBX 1 continues processing for connecting with the second terminal 42 using the line 100b of the PBX 1. The user uses the first terminal 41 so as to start speaking over the line 100b of the PBX 1 (step S26 in FIG. 10).

If there is information about the associating PC 2, the PBX 1 informs the first terminal 41 over the line 100b, and the PC 2 over the Internet line 100a, respectively, that a call connection is requested (step S24 in FIG. 10). The user confirms an inbound call by the first terminal 41 and inputs a reply to the inbound call using the keyboard to the PC 2. This leads to the state of replying to the inbound call. The PBX 1, at the stage that the user having the terminal acknowledging the inbound call is in the state of replying to the inbound call (step S 25 in FIG. 10), establishes a call path between the PC 2 and the second terminal 42 using the Internet line 100a, and continues processing for connecting the PC 2 and the second terminal 42. The user uses the first terminal 41 so as to start speaking using the line 100b of the PBX 1 (step S26 in FIG. 10). In this case, since the PBX 1 is informed of information about the second terminal 42 which is the originator, from the PC 2, it is possible to provide a function of specifying the originating user based on, for example, the number information, or the like.

In this way, the present embodiment, by automatically associating two terminals using the line held by the PBX 1 at the time of activating origination processing or inbound processing by referring to associating terminal information which has been registered in the database 15 of the PBX 1, executes an Internet telephone function using the line of the PBX 1, and uses the terminals 41, 42 associating with the PC as handsets. Further, the terminals 41, 42 used as handsets are extension terminals held by the PBX 1.

Conventionally, in order to establish a call by handsets, it is necessary to assign numbers to the handsets for connecting with an Internet line.

In contrast, in the present invention, the terminals 41, 42 used as handsets are extension terminals held by the PBX 1, as described above, and the connection between the terminals 41, 42 is established using the line 100b of the PBX 1, so that it is not required to additionally assign numbers to the terminals 41,42 for connecting with the Internet line 100a. Accordingly, the PBX 1 can manage the terminals 41, 42 only by the numbers given to the terminals 41, 42.

Further, it has been required to connect the handset with the Internet line such as a LAN conventionally. Therefore it is impossible to make a call in such a state that the handset is separated from the PC, so that the range in which the handset can be used is limited.

In contrast, in the present invention, the terminals 41, 42 corresponding to the-conventional handsets are not required to be connected to the PC with cables in a case that the terminals 41,42 are radio mobile bodies included in the PBX 1. Consequently, these terminals can be used as handsets even in a place away from the installment position of the PC, so that the users have no restriction in places where they use the handsets (terminals).

Further, when, for example, originating manipulation is performed based on the telephone book information stored in the PC 2 and then the user moves to a place away from the installment position of the PC while carrying the terminal used as a handset, or when the user performs an operation carrying the terminal in a place away from the installment position of the PC 2, an inbound call is received at both the PC 2 and the radio mobile terminal used as a handset (terminals 41, 42), so that the user do not miss an opportunity of receiving the inbound call.

Further, in the present invention, by using the terminal accommodated in the PBX 1, for example a radio mobile terminal such as a local PHS (Personal Handy-phone System) or a fixed-line terminal, voice information is transmitted/received over the line 100b held by the PBX 1. Therefore, it is not necessary to reinforce bands of the Internet line 100a such as a LAN.

Conventionally, when constructing an Internet telephone, it is necessary to secure bands for transmitting/receiving voice information in an Internet line such as a LAN. In a case that the user equipment cannot secure bands enough for transmitting/receiving voice, the user equipment is required to be updated for constructing the Internet telephone. As such, there is a problem that the capital investment of the user increases. However, the present embodiment can solve this problem.

Although a case that the PC 2 and the PBX 1 are provided is described above, the present embodiment can be realized with an information processor (such as a workstation, server or the like) having an Internet telephone function, and is not limited to the PC 2. Further, the call connection controller is not limited to the PBX 1. It is also possible to connect with extension terminals over the Internet line 100a such as a LAN included in the lines of the PBX.

FIG. 11 is a block diagram showing the structure of an Internet telephone system according to another embodiment of the present invention. In FIG. 11, the Internet telephone system according to another embodiment of the present invention has the similar structure as the Internet telephone system according to the first embodiment of the present invention shown in FIG. 6, except that a PC 5 corresponding to the second terminal 42 is provided. The same components are indicated by the same reference numerals, and the operations of the same components are similar to that in the first embodiment of the present invention.

The PC 5 includes, as same as the PC 2 shown in FIG. 6, a voice input/output unit 51, a communication interface (I/F) 52 for transmitting/receiving Internet telephone information over an Internet line 101a such as a LAN, and a control software 53 for controlling communications necessary for transmitting/receiving control information between a connection controller such as the PBX 1. A PC 6 has an Internet telephone function which enables to speak to the counterpart terminal over the Internet line 101a such as a LAN.

Figure 12:
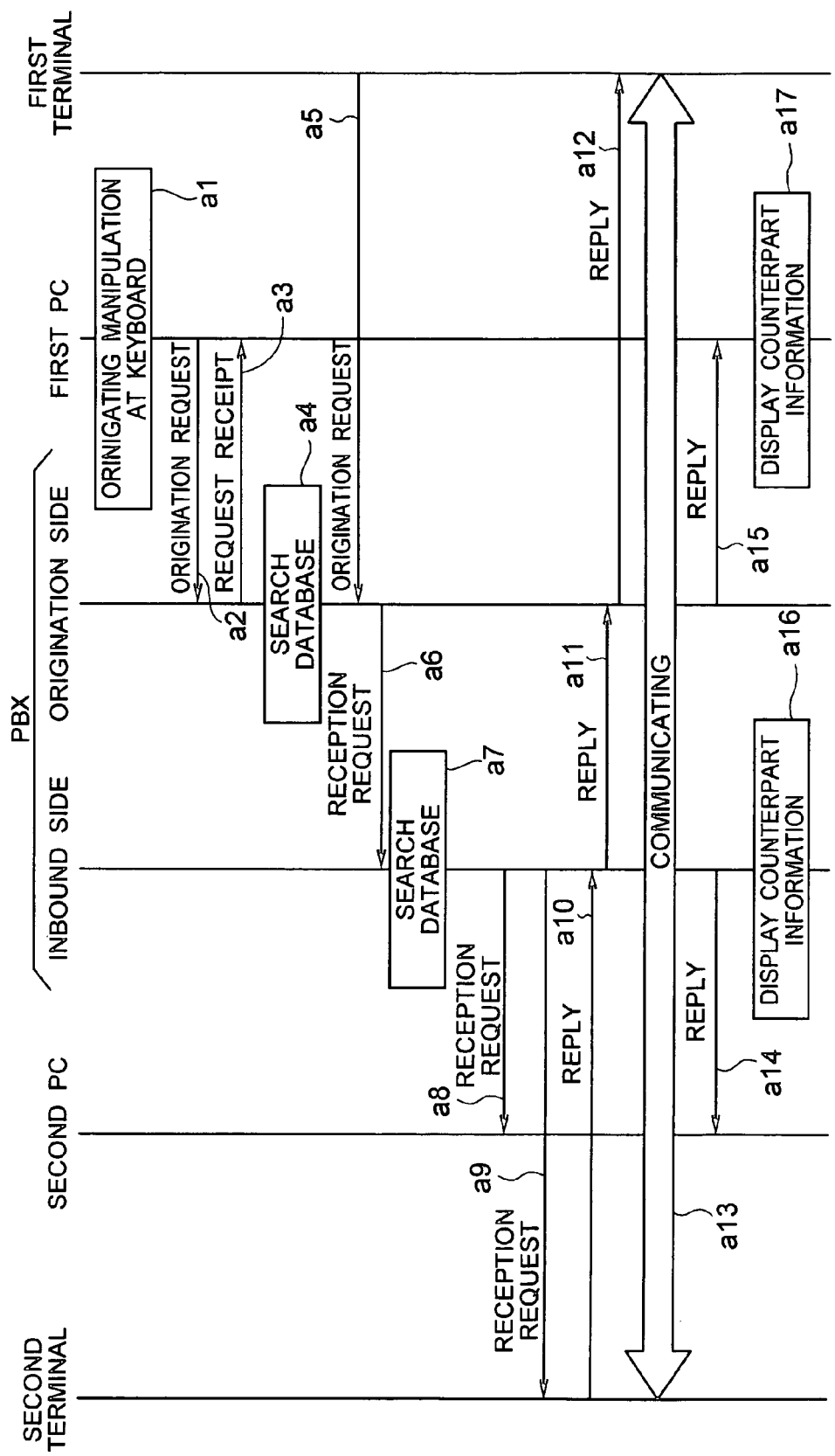
FIG. 12 is a sequence chart showing an operation of making a call using a PC in FIG. 11.
Figure 13:
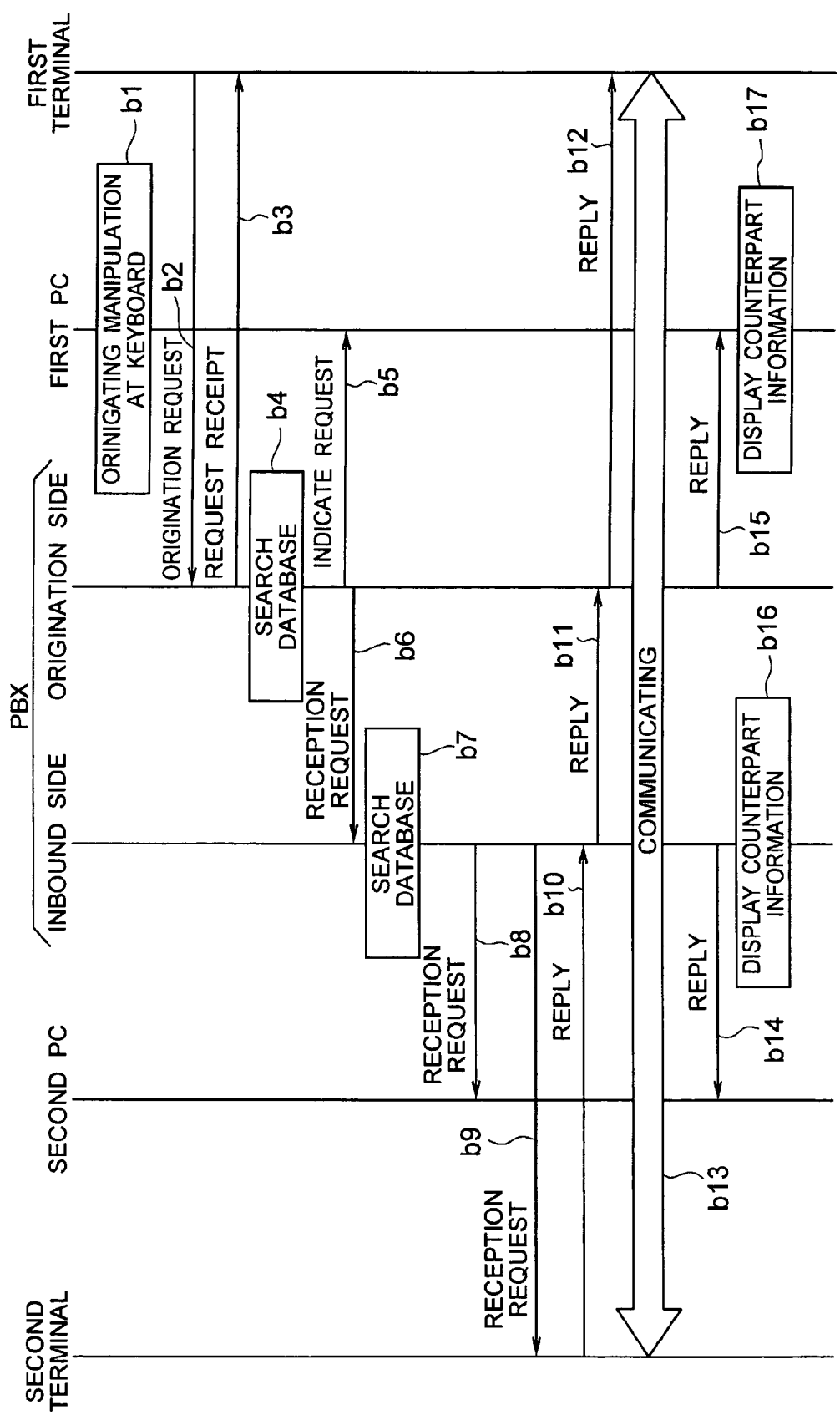
FIG. 13 is a sequence chart showing an operation of making a call using a first terminal in FIG. 11.

FIG. 12 is a sequence chart showing an operation when making a call using the PC 2 in FIG. 11. FIG. 13 is a sequence chart showing an operation when making a call using the first terminal 41 in FIG. 11. Referring to FIGS. 11 to 13, an operation performed at the PC 5 and the second terminal 42, corresponding to each other, responding to an origination from the PC 2 or the first terminal 41 in FIG. 11, will be explained. This processing is realized by a computer of the PBX 1 executing a program in the recording medium 16.

A user having the PC 2 and the first terminal 41, when originating a call, uses a keyboard 24 connected with the PC 2 or manipulates a dial board of the first terminal 41 to thereby make a call to the second terminal 42 (a1 in FIG. 12, b1 in FIG. 13).

The PBX 1 stores information about the second terminal 42 and information about the PC 5 associating with the second terminal 42 by corresponding to each other. When receiving an origination request from the PC 2 or the first terminal 41 (a2 in FIG. 12, b2 in FIG. 13), the PBX 1 replies a request receipt to the PC 2 or the first terminal 41 (a3 in FIG. 12, b3 in FIG. 13).

Then, the originating side of the PBX 1 searches the database 15 and judges whether there is information about an associating terminal (a4 in FIG. 12, b4 in FIG. 13). If it is the origination request from the PC 2, the origination side of the PBX 1 judges that there is information about associating terminal, and starts monitoring the state of the corresponding first terminal 41. The PBX 1, when detecting the origination request from the first terminal 41 (a5 in FIG. 12), transmits a receipt request to the inbound side of the PBX 1 (a6 in FIG. 12).

In the case that the origination request is from the first terminal 41, when the origination side of the PBX 1 judges there is information about associating terminal, informs the corresponding PC 1 of the origination information (request indication) (b5 in FIG. 13), and transmits a receipt request to the inbound side of the PBX 1 (b6 in FIG. 13).

The inbound side of the PBX 1 searches the database 15, and judges whether there is information about the associating terminal (a7 in FIG. 12, b7 in FIG. 13). When judging there is information about the associating terminal, the inbound side of the PBX 1 informs both of the corresponding second terminal 42 and the PC 2 that the first terminal 41 is requesting a call connection (incoming request) over the lines 101a, 101b of the PBX 1 (a8 and a9 in FIG. 12, b8 and b9 in FIG. 13).

The inbound side of the PBX 1, at a stage that the user recognizing the inbound call manipulates so as to cause the second terminal 42 to be in the state of replying to the inbound call (a10 in FIG. 12, b10 in FIG. 13), sends back replies to the origination side of the PBX 1 and the first terminal 41 in order (a11 and a12 in FIG. 12, b11 and b12 in FIG. 13). Thereby, the PBX 1 establishes a call path between the second terminal 42 and the first terminal 41 using the line 101b held by it. The user uses the first terminal 41 to make a call with the second terminal 42 over the line 101b of the PBX 1 (a13 in FIG. 12, b13 in FIG. 13).

In this case, the PBX 1 sends back replies to the PC 2 and the PC 5, respectively (a14 and a15 in FIG. 12, b14 and b15 in FIG. 13). Therefore, on the display of the PCs 2, 5, information about the corresponding second terminal 42 or first terminal 41, which is transmitted over the Internet lines 100a and 101a of the PBX 1, is displayed (a16 and a17 in FIG. 12, b16 and b17 in FIG. 13).

With the aforementioned operation, the PBX 1 connects the PC 2 associating with the first terminal 41 and the PC 5 associating with the second terminal 42 over the Internet lines 100a, 101b such as LANs.

In this way, in the present embodiment, numbers for specifying radio mobile terminals (the first terminal 41, the second terminal 42) which are used as handsets by the both who are communicating each other, such as extensions, and numbers for specifying both PCs 2, 5 associating with the terminals, such as IP addresses, are managed by the PBX 1. Thereby, in addition to the effect obtained from the aforementioned embodiment of the present invention, another effect that the PCs 2, 5 shown in FIG. 11 can share the same information in the calling state.

Conventionally, extension terminals for performing voice call and PCs are formed independent to each other. As such, when performing a file exchange, it is necessary to take such measures as activating a mailing software so as to attach a file to a mail in which the address is designated, or using an FTP (File Transfer Protocol) function so as to perform a file transfer to the counterpart IP address, or the like.

In contrast, in the present embodiment, information can be shared between the PCs 2, 5 easily over the Internet lines 100a, 101a, as described above.

In the present embodiment, an association between the first terminal 41 and the PC 2, and an association between the second terminal 42 and the PC 5 are set respectively in the originating manipulation, as described above. The purpose of this associating processing is to cause the connecting counterpart's number, the speaking period, the state of speaking, or the like to be displayed on the PCs 2, 5 even when radio mobile terminals are used for calling. Of course, in a case of originating a call from the Internet telephone function of the PCs 2, 5, the connecting counterpart's number, speaking period, the state of speaking, or the like are to be displayed on the PCs 2, 5.

In the inbound operation, an association between the first terminal 41 and the PC 2, and an association between the second terminal 42 and the PC 5 are set respectively, as same as aforementioned. The purpose of this associating processing is to cause the connecting counterpart's number, the speaking period, the state of speaking, or the like to be displayed on the PCs 2, 5, even when a call is arrived at radio mobile terminals. Of course, even in a case that a call is arrived at the Internet telephone function of the PCs 2, 5, the connecting counterpart's number, speaking period, the state of speaking, or the like are to be displayed on the PCs 2, 5.

In the inbound operation, it is possible to know information about a PC of the receiver, for example, an IP address, by reading out information about the associating terminal from the database 15. In the calling state, since it is possible to know IP addresses of the PCs of both the originator and the receiver, the counterpart can be specified by inquiring of the PBX 1 about the counterpart of the call, without manually inputting the counterpart information from the PC. This effect can be applied to a video conference (television conference) or the like.

Figure 14:
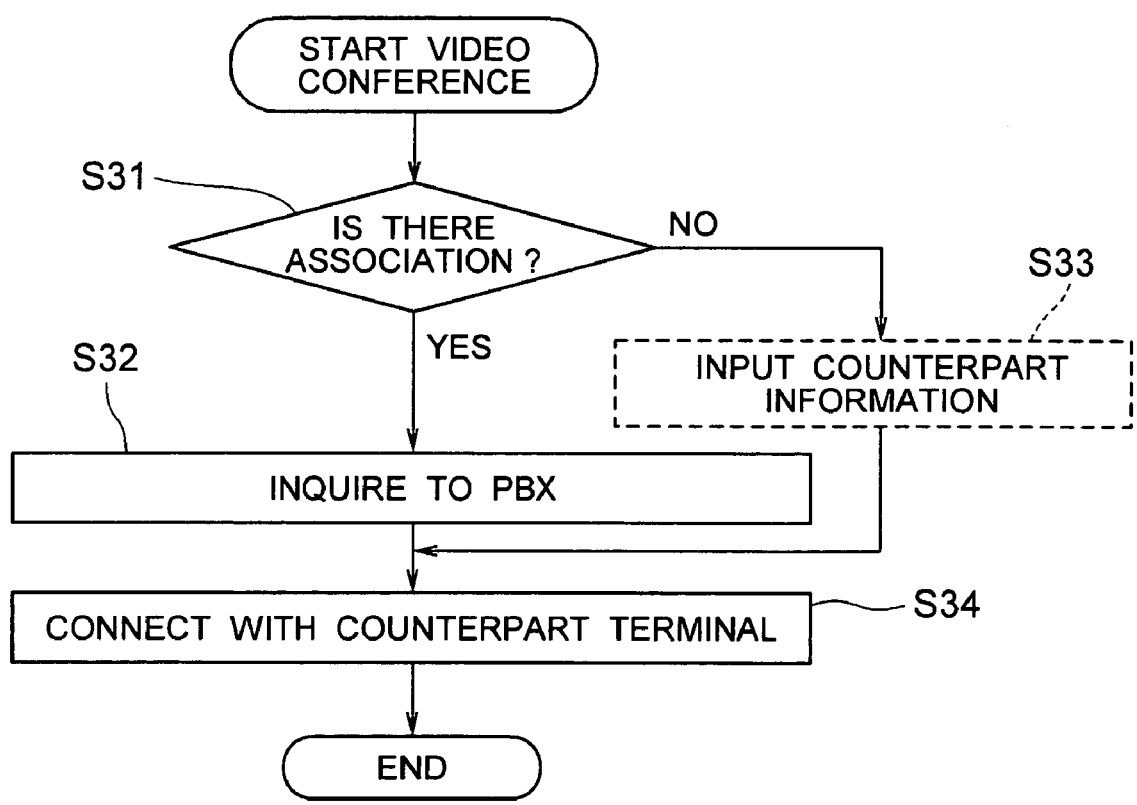
FIG. 14 is a flowchart showing an exemplary operation of a video conference application operable on the PC in FIG. 11.

FIG. 14 is a flowchart showing an exemplary operation of a video conference application which is operable on the PCs 2, 5. Referring to FIG. 14, an operation of a video conference application will be described. This processing is realized by a computer of the PBX 1 executing a program in the recording medium 16.

Conventionally, in the PCs 2, 5, when a video conference application is activated, it is necessary to manually input information for specifying the counterpart such as IP address or the like of the counterpart with which the video conference is to be performed.

In contrast, in the present invention, if there is an association (step S31 in FIG. 14), an inquiry is made from the Internet telephone function of the PCs 2, 5 to the PBX 1 about the counterpart with which the communication is performed, over the lines (100a, 101a) of the PBX 1 (step S32 in FIG. 14). If the corresponding terminals 41, 42 exist, the PBX 1 automatically perform a connection between the terminals (41, 42) using the lines (100b, 101b) of the PBX 1 (step S34 in FIG. 14). Accordingly, there is no need to perform a procedure of manually inputting information for specifying the counterpart such as an IP address of the counterpart shown by the dotted line in FIG. 14 (step S33 in FIG. 14), so that the connecting operation by the user is simplified and eased.

(Effect)

As described above, the present invention has an effect that Internet telephone functions and existing extension terminals can be associated to thereby increase a freedom in a place where the user stays.

What is claimed is:

1. An Internet telephone system comprising:
an information processor having an Internet telephone function enabling to make a call to a counterpart terminal; and
a call connection controller which connects with the information processor over an Internet line and accommodates a telephone terminal; wherein
the telephone terminal is used as an Internet handset, and as a transmission path for voice data transmitted or received by the Internet handset, a line held by the call connection controller is used,
wherein the call connection controller has means for causing the information processor and the telephone terminal corresponding to each other to share call control information at a time of making a call to the counterpart terminal.

2. The Internet telephone system, as claimed in claim 1, wherein the call connection controller includes means for confirming, at a time of originating manipulation, whether there is a telephone terminal which has been corresponded beforehand to an originating terminal.

3. The Internet telephone system, as claimed in claim 1, wherein the telephone terminal is at least one of a radio mobile terminal and a fixed-line terminal accommodated in the call connection controller.

4. The Internet telephone system, as claimed in claim 1, wherein, at a time of making a call from the telephone terminal to the counterpart terminal, call control information thereof is informed to the information processor.

5. The Internet telephone system, as claimed in claim 1, wherein voice information in the telephone terminal is transmitted/received using line equipment held by the call connection controller.

6. The Internet telephone system, as claimed in claim 1, wherein the call connection controller includes means for retaining information for specifying the information processor and information for specifying the telephone terminal by corresponding to each other, as terminal association information.

7. The Internet telephone system, as claimed in claim 6, wherein, at a time of activating origination processing, information is shared between the information processor and the telephone terminal corresponding to each other by referring to the terminal association information which has been registered beforehand in the call connection controller.

8. The Internet telephone system, as claimed in claim 1, wherein the call connection controller is a PBX (private branch exchange).

9. The Internet telephone system, as claimed in claim 1, wherein the call connection controller is a PBX.

10. The Internet telephone system, as claimed in claim 1, wherein the call connection controller is a PBX.

11. An Internet telephone system, comprising:
an information processor having an Internet telephone function enabling to make a call to a counterpart terminal; and
a call connection controller which connects with the information processor over an Internet line and accommodates a telephone terminal; wherein
the telephone terminal is used as an Internet handset, and as a transmission path for voice data transmitted or received by the Internet handset, a line held by the call connection controller is used,
wherein the call connection controller has means for transferring a call reception request from the counterpart terminal, to each of the information processor and the telephone terminal corresponding to each other.

12. The Internet telephone system, as claimed in claim 11, wherein the call connection controller includes means for confirming, at a time of inbound processing, whether there is a telephone terminal which has been corresponded beforehand to a receiving terminal.

13. The Internet telephone system, as claimed in claim 11, wherein the telephone terminal is at least one of a radio mobile terminal and a fixed-line terminal accommodated in the call connection controller.

14. The Internet telephone system, as claimed in claim 11, wherein voice information in the telephone terminal is transmitted/received using line equipment held by the call connection controller.

15. The Internet telephone system, as claimed in claim 11, wherein the call connection controller includes means for retaining information for specifying the information processor and information for specifying the telephone terminal by corresponding to each other, as terminal association information.

16. The Internet telephone system, as claimed in claim 15, wherein, at a time of activating inbound processing, information is shared between the information processor and the telephone terminal corresponding to each other by referring to the terminal association information which has been registered beforehand in the call connection controller.

17. An Internet telephone system, comprising:
an information processor having an Internet telephone function enabling to make a call to a counterpart terminal; and
a call connection controller which connects with the information processor over an Internet line and accommodates a telephone terminal; wherein
the telephone terminal is used as an Internet handset, and as a transmission path for voice data transmitted or received by the Internet handset, a line held by the call connection controller is used, wherein the call connection controller includes: means for causing the information processor and the telephone terminal corresponding to each other to share call control information at a time of making a call to the counterpart terminal; and means for transferring a call reception request from the counterpart terminal, to each of the information processor and the telephone terminal corresponding to each other.

18. The Internet telephone system, as claimed in claim 17, wherein the call connection controller includes means for confirming, at a time of originating manipulation, whether there is a telephone terminal which has been corresponded beforehand to an originating terminal.

19. The Internet telephone system, as claimed in claim 17, wherein the call connection controller includes means for confirming, at a time of inbound processing, whether there is a telephone terminal which has been corresponded beforehand to a receiving terminal.

20. The Internet telephone system, as claimed in claim 17, wherein the telephone terminal is at least one of a radio mobile terminal and a fixed-line terminal accommodated in the call connection controller.

21. The Internet telephone system, as claimed in claim 17, wherein, at a time of making a call from the telephone terminal to the counterpart terminal, call control information thereof is informed to the information processor.

22. The Internet telephone system, as claimed in claim 17, wherein voice information in the telephone terminal is transmitted/received using line equipment held by the call connection controller.

23. The Internet telephone system, as claimed in claim 17, wherein the call connection controller includes means for retaining information for specifying the information processor and information for specifying the telephone terminal by corresponding to each other, as terminal association information.

24. The Internet telephone system, as claimed in claim 23, wherein, at a time of activating origination processing or inbound processing, information is shared between the information processor and the telephone terminal corresponding to each other by referring to the terminal association information which has been registered beforehand in the call connection controller.

25. A call connection controller which connects with an information processor having an Internet telephone function enabling to make a call to a counterpart terminal, accommodates a telephone terminal, and includes means for causing the information processor and the telephone terminal corresponding to each other to share call control information at a time of making a call to the counterpart terminal.

26. The call connection controller, as claimed in claim 25, comprising means for confirming, at a time of originating manipulation, whether there is a telephone terminal which has been corresponded beforehand to a originating terminal.

27. The call connection controller, as claimed in claim 25, wherein the telephone terminal is at least one of a radio mobile terminal and a fixed-line terminal accommodated in the call connection controller.

28. The call connection controller, as claimed in claim 25, wherein, at a time of making a call from the telephone terminal to the counterpart terminal, call control information thereof is informed to the information processor.

29. The call connection controller, as claimed in claim 25, wherein voice information in the telephone terminal is transmitted/received over line equipment held by the call connection controller.

30. The call connection controller, as claimed in claim 25, comprising means for retaining information for specifying the information processor and information for specifying the telephone terminal by corresponding to each other, as terminal association information.

31. The call connection controller, as claimed in claim 30, wherein, at a time of activating origination processing, information is shared between the information processor and the telephone terminal corresponding to each other, by referring to the terminal association information which has been registered in the call connection controller beforehand.

32. The call connection controller, as claimed in claim 25, wherein the call connection controller is a PBX.

33. A call connection controller which connects with an information processor having an Internet telephone function enabling to make a call to a counterpart terminal, accommodates a telephone terminal, and includes means for transferring a call reception request from the counterpart terminal, to each of the information processor and the telephone terminal corresponding to each other.

34. The call connection controller, as claimed in claim 33, comprising means for confirming, at a time of inbound processing, whether there is a telephone terminal which has been corresponded beforehand to a receiving terminal.

35. The call connection controller, as claimed in claim 33, wherein the telephone terminal is at least one of a radio mobile terminal and a fixed-line terminal accommodated in the call connection controller.

36. The call connection controller, as claimed in claim 33, wherein voice information in the telephone terminal is transmitted/received over line equipment held by the call connection controller.

37. The call connection controller, as claimed in claim 33, comprising means for retaining information for specifying the information processor and information for specifying the telephone terminal by corresponding to each other, as terminal association information.

38. The call connection controller, as claimed in claim 37, wherein, at a time of activating inbound processing, information is shared between the information processor and the telephone terminal corresponding to each other, by referring to the terminal association information which has been registered in the call connection controller beforehand.

39. The call connection controller, as claimed in claim 33, wherein the call connection controller is a PBX.

40. A call connection controller which connects with an information processor having an Internet telephone function enabling to make a call to a counterpart terminal, accommodates a telephone terminal, and comprises:

means for causing the information processor and the telephone terminal corresponding to each other to share call control information at a time of making a call to the counterpart terminal, and means for transferring a call reception request from the counterpart terminal, to each of the information processor and the telephone terminal corresponding to each other.

41. The call connection controller, as claimed in claim 40, comprising means for confirming, at a time of originating manipulation, whether there is a telephone terminal which has been corresponded beforehand to an originating terminal.

42. The call connection controller, as claimed in claim 40, wherein the call connection controller includes means for confirming, at a time of inbound processing, whether there is a telephone terminal which has been corresponded beforehand to a receiving terminal.

43. The call connection controller, as claimed in claim 40, wherein the telephone terminal is at least one of a radio mobile terminal and a fixed-line terminal accommodated in the call connection controller.

44. The call connection controller, as claimed in claim 40, wherein, at a time of making a call from the telephone terminal to the counterpart terminal, call control information thereof is informed to the information processor.

45. The call connection controller, as claimed in claim 40, wherein voice information in the telephone terminal is transmitted/received using line equipment held by the call connection controller.

46. The call connection controller, as claimed in claim 40, including means for retaining information for specifying the information processor and information for specifying the telephone terminal by corresponding to each other, as terminal association information.

47. The call connection controller, as claimed in claim 46, wherein, at a time of activating origination processing or inbound processing, information is shared between the information processor and the telephone terminal corresponding to each other by referring to the terminal association information which has been registered beforehand in the call connection controller.

48. The call connection controller, as claimed in claim 40, wherein the call connection controller is a PBX.

49. A terminal association method comprising the steps of:
accessing from an information processor having an Internet telephone function to a call connection controller so as to define a call path using an Internet line between an counterpart terminal; and
causing the telephone terminal accommodated in the call connection controller and corresponding to the information processor, and the information processor, to share call control information at a time of making a call from the call connection controller to the counterpart terminal.

50. The terminal association method, as claimed in claim 49, comprising a step of confirming to the call connection controller, at a time of originating manipulation, whether there is a telephone terminal which has been corresponded beforehand to an originating terminal.

51. The terminal association method, as claimed in claim 49, wherein the telephone terminal is at least one of a radio mobile terminal and a fixed-line terminal accommodated in the call connection controller.

52. The terminal association method, as claimed in claim 49, wherein, at a time of making a call from the telephone terminal to the counterpart terminal, call control information thereof is informed to the information processor.

53. The terminal association method, as claimed in claim 49, wherein voice information in the telephone terminal is transmitted/received over line equipment held by the call connection controller.

54. The terminal association method, as claimed in claim 49, wherein information for specifying the information processor and information for specifying the telephone terminal are retained, by corresponding to each other, as terminal association information in the call connection controller.

55. The terminal association method, as claimed in claim 54, wherein, at a time of activating origination processing, information is shared between the information processor and the telephone terminal corresponding to each other, by referring to the terminal association information which has been registered in the call connection controller beforehand.

56. The terminal association method, as claimed in claim 49, wherein the call connection controller is a PBX.

57. A terminal association method comprising the steps of:
accessing from an information processor having an Internet telephone function to a call connection controller so as to define a call path using an Internet line between a counterpart terminal; and
transferring a call reception request from the counterpart terminal to the information processor and to the telephone terminal accommodated in the call connection controller and corresponding to the information processor.

58. The terminal association method, as claimed in claim 57, comprising a step of confirming, to the call connection controller, at a time of inbound processing, whether there is a telephone terminal which has been corresponded beforehand to a receiving terminal.

59. The terminal association method, as claimed in claim 57, wherein the telephone terminal is at least one of a radio mobile terminal and a fixed-line terminal accommodated in the call connection controller.

60. The terminal association method, as claimed in claim 57, wherein voice information in the telephone terminal is transmitted/received over line equipment held by the call connection controller.

61. The terminal association method, as claimed in claim 57, wherein information for specifying the information processor and information for specifying the telephone terminal are retained, by corresponding to each other, as terminal association information in the call connection controller.

62. The terminal association method, as claimed in claim 61, wherein, at a time of activating inbound processing, information is shared between the information processor and the telephone terminal corresponding to each other, by referring to the terminal association information which has been registered in the call connection controller beforehand.

63. The terminal association method, as claimed in claim 57, wherein the call connection controller is a PBX.

64. A terminal association method comprising the steps of:
accessing from an information processor having an Internet telephone function to a call connection controller so as to define a call path using an Internet line between an counterpart terminal;
causing a telephone terminal accommodated in the call connection controller and corresponding to the information processor, and the information processor, to share call control information at a time of making a call from the call connection controller to the counterpart terminal, and
transferring a call reception request from the counterpart terminal to the information processor and the telephone terminal corresponding to each other.

65. The terminal association method, as claimed in claim 64, comprising a step of confirming to the call connection controller, at a time of originating manipulation, whether there is a telephone terminal which has been corresponded beforehand to an originating terminal.

66. The terminal association method, as claimed in claim 64, comprising a step of confirming to the call connection controller, at a time of inbound processing, whether there is a telephone terminal which has been corresponded beforehand to a receiving terminal.

67. The terminal association method, as claimed in claim 64, wherein the telephone terminal is at least one of a radio mobile terminal and a fixed-line terminal accommodated in the call connection controller.

68. The terminal association method, as claimed in claim 64, wherein, at a time of making a call from the telephone terminal to the counterpart terminal, call control information thereof is informed to the information processor.

69. The terminal association method, as claimed in claim 64, wherein voice information in the telephone terminal is transmitted/received over line equipment held by the call connection controller.

70. The terminal association method, as claimed in claim 64, wherein information for specifying the information processor and information for specifying the telephone terminal are retained, by corresponding to each other, as terminal association information in the call connection controller.

71. The terminal association method, as claimed in claim 70, wherein, at a time of activating origination processing or inbound processing, information is shared between the information processor and the telephone terminal corresponding to each other, by referring to the terminal association information which has been registered beforehand in the call connection controller.

72. The terminal association method, as claimed in claim 64, wherein the call connection controller is a PBX.

73. A recording medium storing a program for causing a PBX/call controller to execute the steps of:
   accessing from an information processor having an Internet telephone function to a call connection controller so as to define a call path using an Internet line between a counterpart terminal; and
   causing a telephone terminal accommodated in the call connection controller and corresponding to the information processor, and the information processor, to share call control information at a time of making a call from the call connection controller to the counterpart terminal.

74. A recording medium storing a program for causing a PBX/call controller to execute the steps of:
   accessing from an information processor having an Internet telephone function to a call connection controller so as to define a call path using an Internet line between an counterpart terminal; and
   transferring a call reception request from the counterpart terminal to the information processor and to a telephone terminal accommodated in the call connection controller and corresponding to the information processor.

75. A recording medium storing a program for causing a PBX/call controller to execute the steps of:
   accessing from an information processor having an Internet telephone function to a call connection controller so as to define a call path using an Internet line between an counterpart terminal;
   causing a telephone terminal accommodated in the call connection controller and corresponding to the information processor, and the information processor, to share call control information at a time of making a call from the call connection controller to the counterpart terminal, and
   transferring a call reception request from the counterpart terminal to the information processor and the telephone terminal corresponding to each other.

* * * * *